United States Patent [19]

Steine et al.

[11] 4,052,531

[45] Oct. 4, 1977

[54] INDIUM-CONTAINING SILVER-COPPER-ZINC BRAZING ALLOY

[75] Inventors: Hans T. Steine, Crissier; Wolfgang Simm, Lausanne, both of Switzerland; Joseph F. Quaas, Island Park, N.Y.

[73] Assignee: Eutectic Corporation, Flushing, N.Y.

[21] Appl. No.: 604,831

[22] Filed: Aug. 14, 1975

[51] Int. Cl.² .................... B32B 15/20; B23K 3/00; C22C 5/08
[52] U.S. Cl. .................... 428/673; 75/134 C; 75/134 T; 75/173 C; 228/263
[58] Field of Search .......... 228/263; 75/134 T, 134 C, 75/134 N, 173 C, 157.5, 160; 29/194, 199; 428/673

[56] References Cited

U.S. PATENT DOCUMENTS

| | | | |
|---|---|---|---|
| 2,456,593 | 12/1948 | Polak | 75/134 C |
| 2,464,821 | 3/1949 | Ludwick et al. | 75/173 C |
| 2,623,273 | 12/1952 | Murray et al. | 29/180 |
| 2,970,248 | 1/1961 | Sahagun | 75/173 C |
| 3,440,039 | 4/1969 | Watson | 75/134 C |

*Primary Examiner*—Arthur J. Steiner
*Attorney, Agent, or Firm*—Hopgood, Calimafde, Kalil, Blaustein and Lieberman

[57] ABSTRACT

A filler metal composition and method are provided for producing strong brazed joints between metal parts, e.g. steel parts, assembled in joint-forming relationship with each other, the filler metal comprising an indium-containing silver brazing alloy consisting essentially by weight of about 30% to 70% Ag, about 3% to 20% In, about 3% to 20% Zn, up to about 0.5% Si and the balance essentially copper.

3 Claims, No Drawings

INDIUM-CONTAINING SILVER-COPPER-ZINC BRAZING ALLOY

This invention relates to indium-containing silver-copper-zinc brazing alloys and to a method of brazing metal parts, and also to brazed joints produced with said alloys.

State of the Art

It is known to torch braze, or furnace braze or vacuum braze metal parts, such as steel parts, using non-ferrous brazing alloys, also known as filler metals, typical filler metals being the well known silver and copper-zinc brazing alloys. The silver alloys are more costly and, in general, melt at lower temperatures than copper-zinc alloys.

With regard to torch brazing, the heat is obtained from a gas flame or flames impinging on or near the joint being brazed, the torch employed generally being of the hand-held type. Generally, a flux is applied to the joint before heating to promote the flow and bonding of filler metal throughout the joint being brazed, the flux being applied as a powder, paste or liquid, or as a mixed paste of flux and filler metal. As surface oxide films inhibit the wetting of the base metal by the filler metal and, therefore, the capillary flow thereof into the joint, the fluxes employed should have sufficient chemical and physical activity to reduce or dissolve the thin oxide surface films without substantially attacking the metal parts being joined.

Typical fluxes include type AWS 3A containing boric acid, borates, fluorides, fluoroborates and wetting agents, said flux being employed at the useful temperature range of about 1050° F to 1600° F (565° C to 872° C); and type AWS 3B which is similar to 3A but differs in being useful at a temperature range of about 1350° F to 2100° F (733° C to 1150° C), etc.

As regards furnace brazing, the parts to be brazed are generally held together by jigs and the parts passed through the furnace on an endless belt, the furnace being maintained at the desirable brazing temperature, a cooling zone being provided to assure solidification of the braze alloy at the joint before the parts leave the end of the furnace. The atmosphere may be inert or slightly reducing, and may comprise an endo gas, nitrogen, 90-10 nitrogen-hydrogen gas mix, and the like.

As regards vacuum brazing, fluxes are not required so long as the metal parts are cleaned.

The filler metal should exhibit relatively high fluidity at the brazing temperatures employed and also exhibit near perfect affinity to ferrous materials and alloys being joined. An example of an exceedingly effective brazing alloy is that disclosed in the prior U.S. Pat. No. 2,279,284, which issued to Rene D. Wassermann, this alloy containing substantial amounts of silver and nickel combined with a major proportion of copper and a large amount of zinc.

As stated hereinabove, a filler metal of relatively high fluidity is most desirable as good fluidity and good wetting are essentail in obtaining the desired combination of physical properties in the brazed joint.

In this connection, certain silver alloy filler metals have been developed and are well known in the commercial brazing art, the alloys being highly fluid and having good wetting properties with regard to the brazing of low-carbon and low-alloy steels. The alloys developed are characterized by the presence of substantial amounts of cadmium, the composition of the commercial alloys ranging by weight from about 30% to 50% Ag, about 15% to 30% Zn, about 15% to 25% Cd and the balance essentially copper ranging from about 15% to 35%.

In light of the recent concern of the environmentalists over the use of toxic materials in articles of commerce, especially in food handling equipment, considerable on-going investigations have been initiated dealing with the problem of avoiding the use of certain toxic chemicals and metals in materials in which the end use could produce toxic side effects on people handling such materials, top on the list being the use of cadmium in brazing alloys.

Thus, it would be desirable to provide alternate filler metal compositions which can be used in place of filler metals containing substantial amounts of cadmium.

We have now developed such a filler metal which has the desired properties that a good filler metal should have while avoiding the toxicity problem of cadmium. The filler metal is applicable to the brazing of stainless steel, copper and copper alloys, nickel and nickel-base alloys and the like.

Objects of the Invention

It is thus the object of the present invention to provide a novel filler metal for use in the brazing of metal parts together, said metal being characterized as an indium-containing silver brazing alloy.

Another object is to provide a method of brazing and a brazed joint produced as a product thereof, the braze alloy employed in the method being characterized as an indium-containing silver brazing alloy.

These and other objects will more clearly appear from the following disclosure and the appended claims.

Statement of the Invention

Stating it broadly, one embodiment of the invention is directed to a filler metal comprising an indium-containing silver brazing alloy consisting essentially by weight of about 30% to 70% Ag, about 3% to 20% In, about 3% to 20% Zn, up to about 0.5% Si and the balance essentially copper. A preferred range is about 35% to 65% Ag, about 6% to 14% In, about 6% to 14% Zn, up to about 0.2% Si and the balance essentially copper, at least 15%.

The foregoing compositions should preferably be free of cadmium, although cadmium may be present in substantially non-toxic amounts less than 2%. Tin, if present, should be as low as is consistently possible to avoid embrittlement and, preferably, should not exceed about 2% by weight.

Iron, manganese, nickel and cobalt can be tolerated in small amounts; however, nickel and/or colbalt may replace copper in amounts ranging up to about 4% by weight. Each of iron and manganese should not exceed about 1%.

The so-called noble metals, e.g. Pt, Pd, Au, Rh, Ru, Ir, may be present in total amounts ranging up to about 10% by weight.

Illustrative compositions within the invention are as follows:

| Element | Alloy No. 1 | 2 | 3 | 4 | 5 |
|---|---|---|---|---|---|
| Ag | 45 | 40 | 55 | 60 | 65 |
| In | 12 | 12 | 8 | 10 | 6 |
| Zn | 12 | 12 | 12 | 6 | 6 |

-continued

| Element | Alloy No. | | | | |
|---|---|---|---|---|---|
| | 1 | 2 | 3 | 4 | 5 |
| Cu | 31 | 36 | 25 | 24 | 23 |
| Solidus Temp. | 622° C | 611° C | 626° C | E691° C* | E708° C* |
| Liquidus Temp. | 630° C | 627° C | 669° C | | |

*Eutectic Melting Point

As will be noted from the examples, the alloy composition may range by weight from about 40% to 65% Ag, about 6% to 12% In, about 6% to 12% Zn and the balance essentially Cu ranging from about 23% to 36%.

Over the broad range of composition, the melting point may range from about 625° C to 710° C, the recommended brazing temperature ranging from about 650° C to about 810° C. Generally, the brazing temperature may range from the liquidus temperature (the melting point) up to 110° C above the liquidus temperature.

Details of the Invention

As stated hereinabove, the invention is particularly applicable to the brazing of stainless steel parts, such as Type 316 stainless. However, the filler metal is applicable to the brazing of other metal parts as well.

As illustrative of the method of the invention, the following examples are given:

EXAMPLE 1

This is an application involving the joining of a 1 inch diameter length of male tubing with a one-sixteenth inch wall thickness made from Type 316 stainless, joined to a stainless steel elbow of similar chemistry. The tubing is inserted one-fourth inch in depth into one end of the elbow of slightly larger diameter, with the joint clearance being about 0.0015 inch. The joint is then inverted with the Type 316 tubing jigged and held in the vertical position with the elbow at the bottom. The joint area where the tubing and elbow are to be joined is prefluxed with a paste type flux comprising boric acid and potassium pentaborate. The joint is then preheated and brought to a temperature of about 640° C and a filler alloy in rod form comprising the composition of Alloy No. 2 in the table hereinbefore is melted, with the fluid alloy completely wetting the one-fourth inch circumferential joint area due to its excellent capillarity. The capillarity of the molten alloy is so complete that all flux is displaced by the molten alloy in the joint area. Upon solidification of the molten alloy, the joined members are cleaned of flux by employing a hot water rinse and brushing with a wire brush.

EXAMPLE 2

This application relates to the joining of two covered discs of stainless steel Type 304 to a methyllic pressure bellows also manufactured from Type 304 stainless steel. The two covered end discs plus the pressure bellows are inserted in a series of jigs which are mounted on a continuous metallic transfer belt for feeding through a high temperature furnance set at 710° C. A paste flux of the borate-fluoride type is applied around the periphery of the joint area where both end discs make contact with the metallic bellows. A filler alloy in ring form comprising Alloy No. 4 in the table hereinbefore is then preplaced around both joint areas. This alloy, with its accumulative high percentage of the white metals, namely, silver, indium and zinc, is used not only for its high strength levels, but also for color matching purposes with the stainless parent material. This alloy exhibits good capillarity at 710° C and provides a strong joint.

As will be clearly apparent, the invention provides, in addition to a filler metal composition, a method of brazing metal parts together comprising assembling said metal parts in joint-forming relationship with each other, with the filler metal disposed in proximity to the assembled parts, applying heat to the joint-forming assembly and upon the filler sufficient to melt said filler metal and cause it to flow in and about the joint-forming portion of said assembly, and then allowing the molten filler metal to solidify and form a strong joint between said metal parts.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A brazed joint comprising at least a pair of metal parts joined together by a filler metal comprising an indium-containing silver brazing alloy consisting essentially by weight of about 40% to 65% Ag, about 6 to 12% In, about 6 to 12% Zn, up to about 0.5% Si and the balance essentially copper ranging from about 23% to 36%.

2. A method of brazing metal parts together which comprises, assembling said metal parts in joint-forming relationship with each other with a filler metal disposed in brazing proximity thereto, said filler metal comprising an indium-containing silver brazing alloy consisting essentially by weight of about 40% to 65% Ag, about 6 to 12% In, about 6 to 12% Zn, up to about 0.5% Si and the balance essentially copper ranging from about 23% to 36%, applying heat to said joint-forming assembly to preheat the same and heat said filler metal sufficient to melt said filler metal and cause it to flow in and about the joint-forming portion of said assembly and then allowing the molten filler metal to solidify and form a strong joint between said metal parts.

3. The method of brazing of claim 2, wherein said method is carried out in the brazing together of ferrous metal parts.

* * * * *